(12) United States Patent
Richins et al.

(10) Patent No.: US 10,275,249 B1
(45) Date of Patent: Apr. 30, 2019

(54) METHOD AND APPARATUS FOR PREDICTING END OF LOOP

(71) Applicant: Marvell International Ltd., Hamilton (BM)

(72) Inventors: Daniel J. Richins, Austin, TX (US); Joseph Delgross, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 114 days.

(21) Appl. No.: 15/272,248

(22) Filed: Sep. 21, 2016

Related U.S. Application Data

(60) Provisional application No. 62/242,209, filed on Oct. 15, 2015.

(51) Int. Cl.
*G06F 9/30* (2018.01)
*G06F 9/38* (2018.01)

(52) U.S. Cl.
CPC ........ *G06F 9/30065* (2013.01); *G06F 9/3802* (2013.01)

(58) Field of Classification Search
None
See application file for complete search history.

(56) References Cited

U.S. PATENT DOCUMENTS

| | | | |
|---|---|---|---|
| 7,130,991 B1* | 10/2006 | Butler | G06F 9/325 712/241 |
| 2009/0055635 A1* | 2/2009 | Tani | G06F 9/30072 712/241 |
| 2014/0208039 A1* | 7/2014 | Gilbert | G06F 12/0862 711/137 |
| 2015/0227374 A1* | 8/2015 | Blasco | G06F 9/3806 712/240 |

* cited by examiner

*Primary Examiner* — George Giroux

(57) ABSTRACT

Embodiments include a method comprising: executing a loop during a first encounter of the loop; tracking a first number of times the loop is iterated while the loop is executed during the first encounter; executing the loop during a second encounter of the loop; tracking a second number of times the loop is iterated while the loop is executed during the second encounter; and in response to the first number being equal to the second number, predicting a behavior of the loop during a third encounter of the loop.

20 Claims, 5 Drawing Sheets

US 10,275,249 B1

METHOD AND APPARATUS FOR PREDICTING END OF LOOP

CROSS REFERENCE TO RELATED APPLICATIONS

This disclosure claims priority to U.S. Provisional Patent Application No. 62/242,209, filed on Oct. 15, 2015, which is incorporated herein by reference in its entirety.

TECHNICAL FIELD

Embodiments of the present disclosure relate to computer architecture, and in particular to branch and loop prediction.

BACKGROUND

Many computer programs contain conditional codes (e.g., if-then-else structure), which are also referred to as "branch." Thus, when the execution of the code arrives at the branch, based on a condition, one of two or more possible paths is taken.

A branch predictor is a digital circuit that aims to predict which way a branch will take, before a condition associated with the branch has been actually calculated and a conditional jump has passed the execution stage in the instruction pipeline. Such a prediction of the branch, for example, improves the flow in one or more associated instruction pipelines. Without branch prediction, a processor would have to wait until the conditional jump instruction has passed the execute stage before the next instruction can enter the fetch stage in the pipeline.

SUMMARY

In various embodiments, the present disclosure provides a method comprising: executing a loop during a first encounter of the loop; tracking a first number of times the loop is iterated while the loop is executed during the first encounter; executing the loop during a second encounter of the loop; tracking a second number of times the loop is iterated while the loop is executed during the second encounter; and in response to the first number being equal to the second number, predicting a behavior of the loop during a third encounter of the loop.

In various embodiments, the present disclosure also provides a device comprising: memory storing instructions that includes a loop; a processor configured to execute the loop during (i) a first encounter of the loop and (ii) a second encounter of the loop; and a circuit configured to track (i) a first number of times the loop is iterated while the loop is executed during the first encounter and (ii) a second number of times the loop is iterated while the loop is executed during the second encounter, and in response to the first number being equal to the second number, predict a behavior of the loop during a third encounter of the loop.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

In many computer programs, two-way branching is usually implemented with a conditional jump instruction. A conditional jump can either be "not taken" or "taken." If a conditional jump is "not taken," the execution continues with a first branch of code which follows immediately after the conditional jump. On the other hand, if the conditional jump is "taken," the execution jumps to a different place in program memory where a second branch of code is stored. Usually, it is not known for certain whether a conditional jump will be taken or not taken until the condition has been actually calculated and the conditional jump has passed the execution stage in the instruction pipeline.

Figure 1:
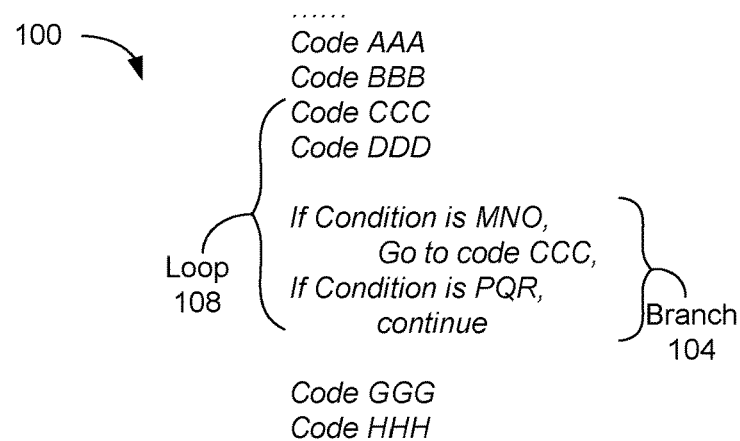
FIG. 1 illustrates example pseudocodes including a branch and a loop.

For example, FIG. 1 illustrates example pseudocodes 100 illustrating a branch 104 and a loop 108. The pseudocodes 100 include example codes AAA, BBB, CCC and DDD, and the branch 104 is executed after the execution of these codes. In an example, a program counter is a register (not illustrated in FIG. 1) that contains an address (i.e., a location) of an instruction being executed at a current time. As each instruction gets fetched and executed, the program counter increases its stored value by, for example, 1. Referring to FIG. 1, as the codes AAA, BBB, CCC and DDD occur prior to the branch 104, the addresses of the codes AAA, BBB, CCC and DDD are lower than the address of the branch 104.

In the branch 104, if an example condition is "MNO," the code branches out and jumps to code CCC. On the other hand, if the condition is "POR," the execution continues to the subsequent codes GGG, HHH. In this example, the continuation of the execution of the codes GGG, HHH corresponds to the branch 104 being "not taken," and the jump to the code CCC corresponds to the branch 104 being "taken."

In FIG. 1, because one of the branches of the branch 104 refers back to the code CCC (which has a lower address than the branch 104), a loop 108 is created whenever the execution returns to code CCC, i.e., whenever the branch 104 is taken. For example, an address of the code CCC is lower than an address of the branch 104 (e.g., because the code CCC appears earlier in the sequence of codes illustrated in Fi. 1). A loop can be described as a conditional backwards branch, e.g., a branch instruction which changes program flow to execute at a lower program counter. For example, each time the branch 104 loops back to code CCC, the program counter is decremented or lowered to reflect the jump back to the code CCC. When the branch 104 is not taken, the execution breaks, exits or comes out of the loop 108, i.e., goes to code GGG. In an example, the loop 108 may be executed multiple times (e.g., corresponding to the multiple times during which the branch 104 is taken), before the loop 108 ends based on the branch 104 not being taken.

Figure 2:
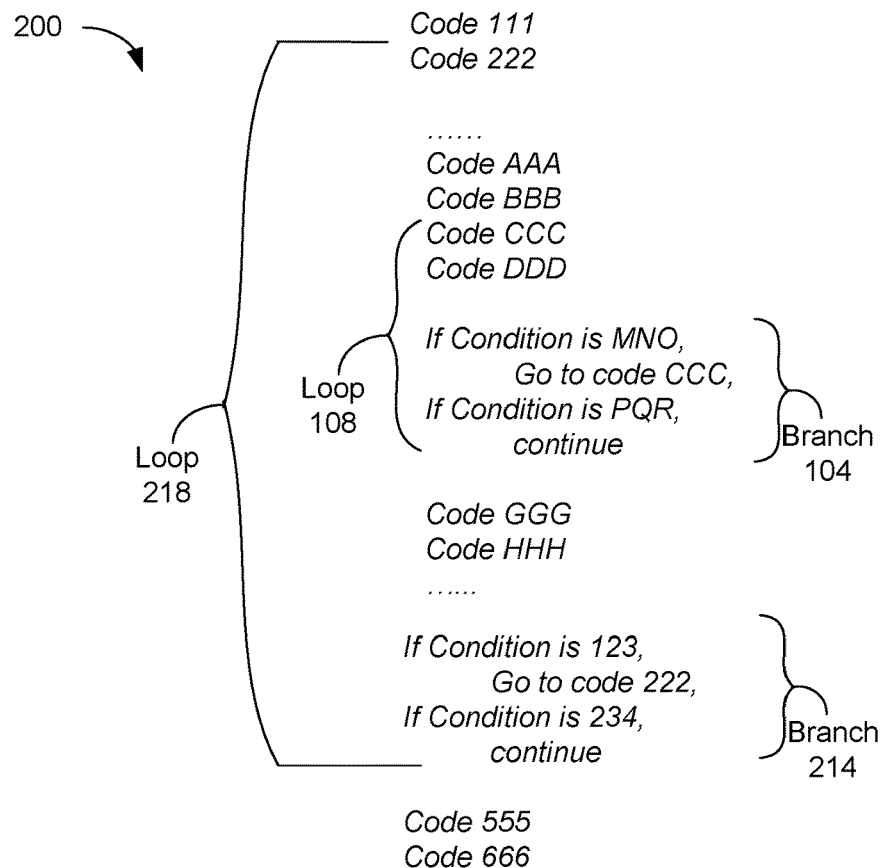
FIG. 2 illustrates a loop being included within another loop.

In an example, a loop (e.g., the loop 108) can be nested within or included within another large loop. For example, FIG. 2 illustrates the loop 108 being included within another loop 218. The loop 218 includes a branch 214, which can either be taken and the execution jumps to code 222, or be not taken and the execution continues to subsequent code 555.

Thus, during a first execution of the loop 218 (e.g., within which the loop 108 is included), the loop 108 is executed multiple times, prior to breaking off or exiting the loop 108. That is, while the loop 218 is executed for a first time, the nested loop 108 is executed multiple times. Similarly, during a second execution of the loop 218, the loop 108 is again executed multiple times, prior to breaking off or exiting. This process continues each time the larger loop 218 is executed.

As an example, the loop 108 executes a first number of times during the first execution of the loop 218, prior to breaking off; the loop 108 executes a second number of times during the second execution of the loop 218, prior to breaking off; the loop 108 executes a third number of times during the third execution of the loop 218, prior to breaking off; and so on. In an example, the loop 108 repeatedly executes the same number of iterations each time the loop 108 is encountered, i.e., the first, second and third numbers are the same. Such behavior of the loop 108 is commonly seen in many loops. For such a loop (e.g., which repeatedly executes the same number of iterations each time the loop is encountered), the past behavior of the loop (the number of "taken" instances each time the loop is encountered) predicts future behavior of the loop.

Figure 3:
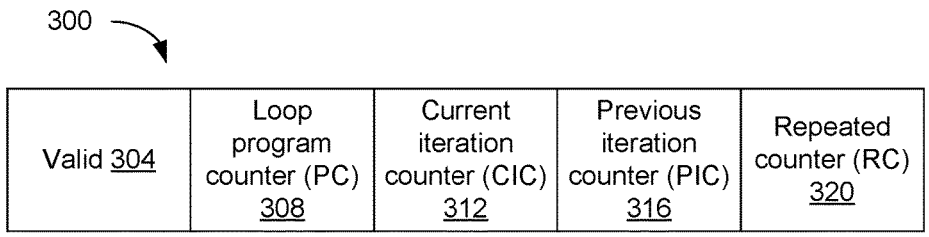
FIG. 3 illustrates a register structure configured to track past behavior of a branch and a loop.

FIG. 3 illustrates a register structure 300 configured to track past behavior of the branch 104 and the loop 108. The register structure 300 comprises a plurality of registers. In an example, a computing device includes several such register structures (referred to as an array of register structures). Each such register structure is configured to track past behavior of a corresponding loop and branch (e.g., the register structure 300 tracking past behavior of the branch 104 and loop 108). In an example, the register structure 300 is configured to track behavior of a branch that refers backwards to a lower addressed code when taken, e.g., the branch 104. An array of register structures can track past behavior of multiple such branches and loops.

In an example, the register structure 300 of FIG. 3 includes a valid register 304. The valid register 304, for example, is a single bit register that indicates whether the register structure 300 is valid, i.e., contains legitimate values.

In an example, the register structure 300 of FIG. 3 includes a loop program counter (PC) 308. The loop PC 308, for example, stores an address of a backward branch of the loop associated with the register structure 300. For example, the backward branch of the loop 108 refers to the code CCC, and hence, the loop PC 308 stores the address of the code CCC. Once the register structure 300 is assigned to track past behavior of the loop 108, the contents of the loop PC 308 usually will not change (e.g., unless the underlying coding of the loop 108 changes).

In an example, the register structure 300 of FIG. 3 includes a current iteration counter (CIC) 312, a previous iteration counter (PIC) 316 and a repeated counter (RC) 320, which are discussed in more detail herein below.

As discussed herein above, during each encounter of the loop 108, the loop 108 is iterated multiple times (e.g., the branch 104 is not taken multiple times, after which the branch 104 is eventually taken, as a result of which the execution exits the loop 108). A single encounter of the loop 108 is a result of the larger loop 218 being executed or iterated a single time. An encounter of the loop 108 is performed, for example, after the code BBB is executed.

As the larger loop 218 is likely to be iterated multiple times, the loop 108 is also encountered multiple times. For example, each iteration of the loop 218 results in a single encounter of the loop 108. During each encounter of the loop 108, the loop 108 is iterated multiple times. For example, the loop 108 is encountered once after the code BBB is executed and the execution of the loop 108 begins. During a specific encounter of the loop 108, the loop 108 is iterated multiple times, e.g., based on how many times the branch 104 is taken, before finally being not taken.

In an example, the CIC 312 holds the current iteration count of the loop 108 during the current encounter of the loop 108. For example, if during the current encounter of the loop 108, the loop 108 has currently been taken 11 times (i.e., if the loop 108 is iterated 11 times so far during the current iteration), the current value of the CIC 312 is 11. If the loop 108 is iterated once more, the CIC 312 is incremented to 12, and so on.

The PIC 316 stores a final number of iterations for the last encounter of the loop 108. For example, during a first encounter of the loop 108, if the loop is iterated 12 times before eventually being taken (i.e., iterated 12 times before the loop 108 ends), subsequent to the completion of the first encounter the PIC 316 stores the value of 12. That is, after the loop 108 ends, the final value from the CIC 312 (which provides the current value of iterations while the loop ends) is transferred to the PIC 316.

The RC 320 stores a number of consecutive encounters of the loop 108, during which the same number of iterations of the loop 108 was executed. For example, assume that during each of a first, second and third consecutive encounters of the loop 108 so far, the loop 108 was iterated 12 times—accordingly, the PIC 316 is set to 12 and the RC 320 is set to 3. Assume that during a fourth encounter (e.g., which occurs consecutively subsequent to the first, second and third encounters) of the loop 108, the loop 108 is again iterated 12 times—accordingly, the PIC 316 is still set to 12 and the RC 320 is updated to 4.

Figure 4:
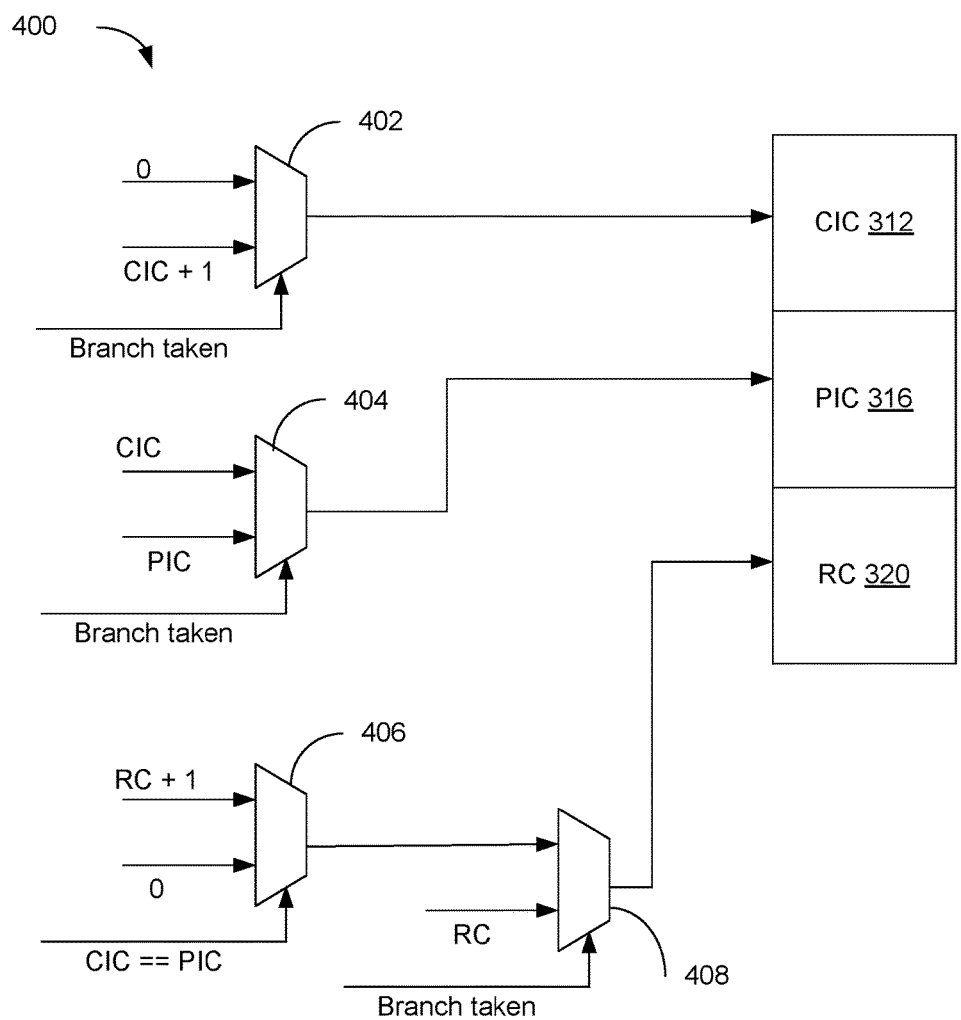
FIG. 4 illustrates a circuit for updating values of various registers of a register structure.

FIG. 4 illustrates a circuit 400 for updating the values of the CIC 312, PIC 316 and RC 320 of the register structure 300. In an example, the circuit 400 may be included in a computing device that executes the pseudocodes 100 and 200 of FIGS. 1 and 2, respectively.

In an example, the circuit 400 includes a multiplexer 402 that receives a first input of zero (0), and a second input of (CIC+1), where the CIC of FIG. 4 may be the same as the CIC 312 discussed in connection with FIG. 3. The multiplexer 402 is controlled by a control input "branch taken" associated with the branch 104. An output of the multiplexer 402 is used to update the CIC 312 of the register structure 300. For example, if the branch 104 is not taken (i.e., if the loop 108 is currently iterated during a specific encounter of the loop 108), the multiplexer 402 outputs CIC+1, and this is used increment the CIC 312 of the register structure 300. That is, if the branch 104 is not taken and the loop 108 is iterated, the CIC value is incremented by one. On the other hand, if the branch 104 is taken, the iterations of the loop 108 ends for the current encounter of the loop 108, and the CIC 312 is reset to zero via the second input of the multiplexer 402.

In an example, the circuit 400 also includes a multiplexer 404 that receives a first input of CIC 312, and a second input of PIC 316. The PIC 316 of FIG. 4 may be the same as the PIC 316 discussed in connection with FIG. 3. The multiplexer 404 is controlled by the control input "branch taken" associated with the branch 104, and is used to update the PIC 316 of the register structure 300. For example, if the branch 104 is not taken (i.e., if the loop 108 is iterated during an encounter of the loop 108), the multiplexer 402 outputs the previous PIC value, i.e., the value of the PIC 316 is not updated if the branch 104 is not taken (e.g., because if the branch 104 is not taken, the iterations of the loop 108 is not finished for the current encounter of the loop 108—hence, the PIC 316 is not updated). On the other hand, if the branch 104 is taken, the iterations of the loop 108 ends for the current encounter of the loop 108, and the PIC 316 is updated with the final CIC value of current encounter (i.e., the multiplexer 404 outputs the CIC).

In an example, the circuit 400 also includes a multiplexer 406 that receives a first input of zero, and a second input of (RC+1), where the RC of FIG. 4 may be the same as the RC 320 discussed in connection with FIG. 3. The multiplexer 406 is controlled by a control input "CIC==PIC" associated with the branch 104. That is, if CIC==PIC (i.e., if the value of CIC 312 is equal to the value of PIC 316), the multiplexer 406 outputs (RC+1); and if the value of CIC 312 is not equal to the value of PIC 316, the multiplexer 406 outputs zero. An output of the multiplexer 406 is provided as a first input to another multiplexer 408. The multiplexer 408 also receives RC as its second input and is controlled by the control input "branch taken" associated with the branch 104. An output of the multiplexer 408 is used to update the RC 320.

Referring to the operations of the multiplexer 408, if the branch 104 is not taken, the iterations for the current encounter of the branch 104 have not ended yet. Thus, in this case, there is no need to update the RC, and the previous value of the RC is rewritten to the RC 320 (i.e., the RC is not updated) based on the multiplexer 408 outputting its second input (RC). However, if the branch is taken (i.e., if the execution of the loop 108 ends for the current encounter of the loop 108), the multiplexer 408 outputs its first input, i.e., the output of the multiplexer 406. That is, if the branch is taken, the output of the multiplexer 406 is used to update the RC 320.

The output of the multiplexer 406 is relevant only if the branch 104 is taken (because, if the branch 104 is not taken, the multiplexer 408 simply discards output of the multiplexer 406). Also, if the branch 104 is taken, the RC 320 is incremented only if the CIC 312 of the current encounter is equal to the PIC 316 of the last encounter (i.e., if CIC==PIC). For example, assume that during a first encounter of the loop 108, the loop 108 undergoes a first number of iterations. Thus, at the end of the first encounter, the PIC 316 is updated with the first number. During a second encounter of the loop 108, assume that the loop 108 undergoes a second number of iterations. Thus, at the end of the second encounter, the final value of the CIC 312 will be the second number. If the second number is equal to the first number (i.e., if the loop 108 undergoes the same number of iterations during the two encounters), then at the end of the second encounter (i.e., at the branch taken condition for the second encounter), the value of CIC 312 is equal to the value of the PIC 316 (i.e., CIC==PIC), and the RC 320 is incremented by one (i.e., the "RC+1" input to the multiplexer 406 is used to update the RC 320). On the other hand, if the second number is not equal to the first number (i.e., if the loop 108 undergoes different number of iterations during the two encounters), then at the end of the second encounter, the CIC 312 is not equal to the PIC 316, and the RC 320 is reset to zero (i.e., the zero input to the multiplexer 406 is used to update the RC 320).

Thus, put differently, if the loop 108 repeatedly undergoes the same number of iterations each time the loop 108 is encountered, the RC 320 is repeatedly incremented. The register structure 300 is used to predict future behavior of the loop 108 once RC 320 is sufficiently large, e.g., once RC 320 has reached a threshold value (e.g., a threshold value 612 of FIG. 6, discussed herein later). That is, if the RC 320 reaches the threshold value, it is assumed that the iteration counts of the loop 108 is sufficiently stable to warrant making future predictions.

In an example, this threshold value is set by a user or programmer of the pseudocodes 100 and 200. In another example, the threshold value is dynamically adjusted, e.g., based on the value of the PIC 316. For example, the higher the value of the PIC 316, the lower is the threshold value. Thus, for example, if the PIC 316 is relatively high, for example, 500, the loop 108 is iterated 500 times each time the loop 108 is encountered. So, it takes a relatively long time for the loop 108 to finish each encounter, and accordingly, a future behavior of the loop 108 can be based on past history from a relatively small number of encounters (i.e., a relatively low number for the threshold value). However, for example, if the PIC 316 is relatively low (e.g., 8), the loop 108 is iterated only 8 times each time the loop 108 is encountered. So, it takes relatively less time for the loop 108 to finish each encounter, and accordingly, a future behavior of the loop 108 can be based on past history from a relatively large number of encounters (i.e., a relatively high number of the threshold value)

Figure 5:
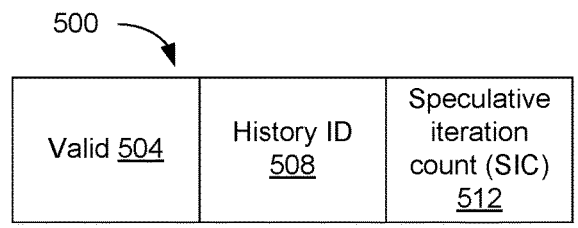
FIG. 5 illustrates a prediction register structure configured to predict future behavior of a branch and a loop.

FIG. 5 illustrates a prediction register structure 500 (also referred to herein as register structure 500) configured to predict future behavior of the branch 104 and the loop 108, e.g., based on tracking the past behavior of the branch 104 and the loop 108. The register structure 500 comprises a plurality of registers. In an example, a computing device includes several such prediction register structures (referred to as an array of prediction register structures). Each such prediction register structure is configured to predict future behavior of a corresponding loop and branch. An array of prediction register structures can predict future behavior of multiple such branches and loops.

In an example, the register structure 500 of FIG. 5 includes a valid register 504. The valid register 504, for example, is a single bit register that indicates whether the register structure 500 is valid, i.e., contains legitimate values.

In an example, the register structure 500 of FIG. 5 further includes a history identification (ID) register 508. The history ID register 508 refers to, or indexes a register structure that stores past history information of a loop associated with the register structure 500. For example, if the register structure 500 of FIG. 5 predicts behavior of the loop 108 and the register structure 300 of FIG. 3 tracks history of the loop 108, then the history ID register 508 indexes or otherwise points to the register structure 300. That is, the history ID register 508 links the register structure 500 with the register structure 300.

In an example, the register structure 500 of FIG. 5 also includes a speculative iteration counter (SIC) 512. The SIC 512 stores a current predicted count of iterations during the current encounter of the loop 108, as seen from a front end of a pipeline associated with the loop 108. For example, assume that during a specific encounter of the loop 108, the loop 108 is currently being iterated 10 times (e.g., the branch 104 has been taken 10 times). Thus, the CIC 312 of FIG. 3 is currently 10. Also, assume that the PIC 316 has a higher value, e.g., 20. However, the front end of the pipeline may be pre-processing future iterations of the loop 108, e.g., pre-processing the $12^{th}$ iteration of the loop 108. Accordingly, the SIC 512, for example, 12 (i.e., is has been predicted that the loop 108 will iterate at least 12 times, and the $12^{th}$ iteration is being pre-processed by the front end of the pipeline, e.g., by pre-fetching instructions associated with the $12^{th}$ iteration of the loop 108 from a memory). It is to be noted that as the PIC 316 in this example is 20 and assuming that the RC 320 is at least as high as the threshold value, the front end of the pipeline/microprocessor will be pre-processing up to 20 iterations of the loop 108 (i.e., the SIC 512 is gradually incremented up to 20). Subsequently, as the loop 108 is predicted to end after 20 iterations, no further pre-processing of the loop 108 is performed once the SIC 512 reaches 20 (e.g., after which the SIC 512 resets).

Figure 6:
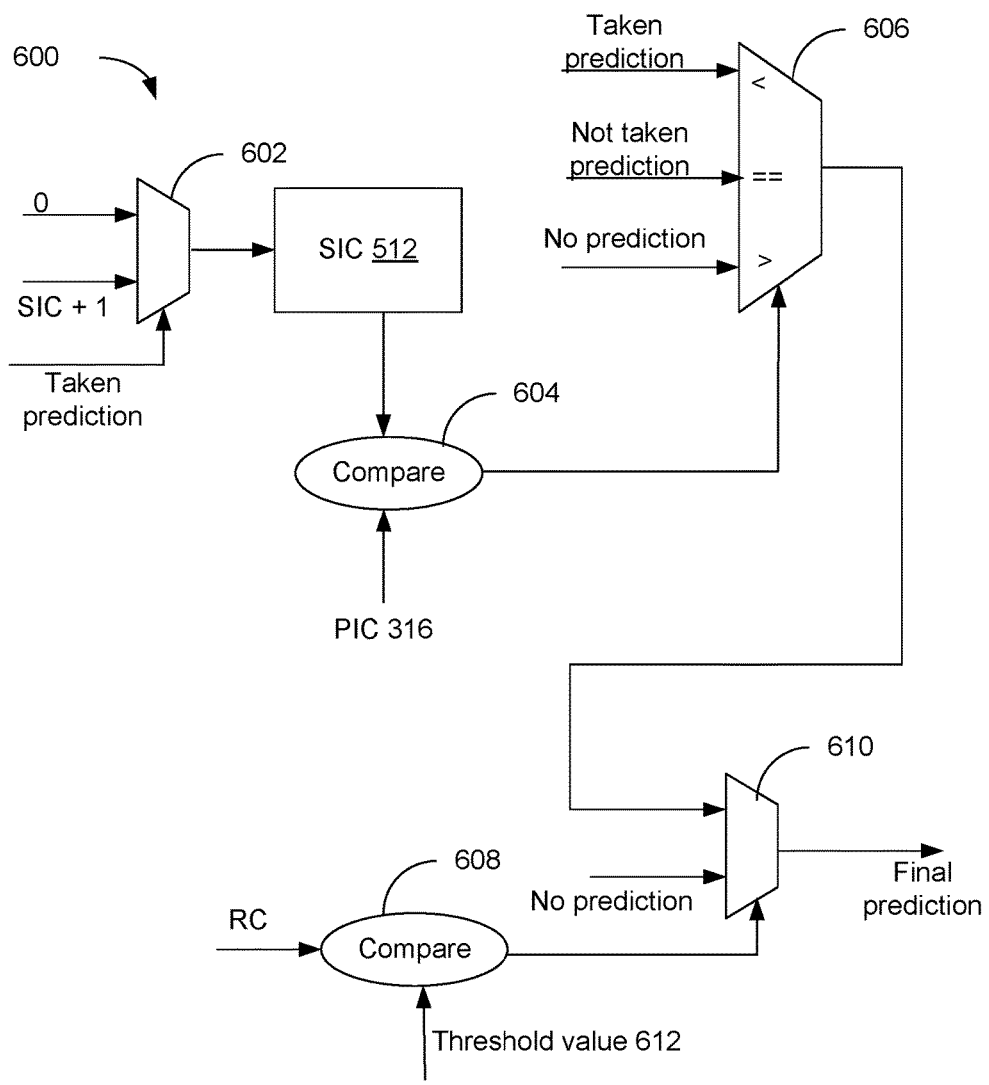
FIG. 6 illustrates a circuit for updating a prediction register structure and predicting the behavior of a loop.

FIG. 6 illustrates a circuit 600 for updating the prediction register structure 500 and predicting the behavior of the loop 108. The circuit 600 comprises a multiplexer 602 configured to receive either a zero or (SIC+1), and update the SIC 512. The SIC 512 may be the same as the SIC 512 discussed in connection with FIG. 5. The multiplexer 602 is controlled by a control input "taken prediction." For example, if the circuit 600 outputs a "taken prediction," this implies that the circuit 600 is predicting the currently predicted iteration of the loop 108 to be taken (i.e., another iteration of the loop 108 is predicted). Accordingly, the SIC 512 is incremented. On the other hand, if the circuit 600 has a different output (e.g., not taken prediction, or no prediction), the SIC 512 is reset to zero.

A comparator 604 of the circuit 600 receives the SIC 512 and the PIC 316, and compares these two values. The PIC 316 may be the same as the PIC 316 discussed in connection with FIG. 3. An output of the comparator 604 is received as a control input for a multiplexer 606 of the circuit 600. As discussed herein previously, if the SIC 512 is less than the PIC 316, then the end of the loop 108 has not been reached yet and the multiplexer 506 outputs a taken prediction, i.e., predicts that the backward branch is to be taken, and predicts at least another iteration of the loop 108 at the front end of the pipeline. Thus, if the comparator 604 outputs that the SIC 512 is less than PIC 316 (i.e., if SIC<PIC), then the multiplexer 606 outputs a taken prediction.

As the SIC 512 is gradually incremented (e.g., by the multiplexer 602) and eventually becomes equal to the PIC 316 (i.e., when the comparator 604 indicates that "SIC==PIC"), the multiplexer 606 outputs a prediction of not taken. At this point, the SIC 512 is reset to zero (e.g., by the multiplexer 602) to prepare for the next time the loop 108 is encountered. In case the PIC 316 is greater than the SIC 512, this implies some kind of error or mis-prediction in the final iteration of the loop 108, and hence, "no prediction" is output by the multiplexer 606.

The output of the multiplexer 606 is received by another multiplexer 610, which also receives another input of "no prediction." The circuit 600 further comprises a comparator 608, which compares the value of RC 320 with a threshold value 612. The RC of FIG. 6 may be the same as the RC 320 discussed in connection with FIG. 3. If the RC 320 is less than the threshold value 612, then there is not sufficient past history to rely on to predict future behavior of the loop 108, and the circuit 600 outputs a no prediction flag (i.e., does not provide any prediction). If the RC 320 is higher than the threshold value 612, then there is sufficient past history to rely on to predict future behavior of the loop 108, and the multiplexer 610 outputs the output of the multiplexer 606 as the final prediction (i.e., outputs one of taken prediction, not taken prediction, or no prediction, as discussed with respect to multiplexer 606).

It is possible that the behavior of the loop 108 changes with time (e.g., either gradually, or suddenly) for a variety of reasons. For example, assume that for the past few iterations, the loop 108 undergoes 200 iterations each time the loop 108 is encountered. Accordingly, the PIC 316 is set to 200, and the SIC 512 is incremented until it reaches 200 (after which it is reset to zero). Assume that during a specific encounter of the loop 108, the SIC 512 is incremented until it reaches 180. Also assume that while the SIC 512 has a value of 180 (i.e., while the front end of the pipeline is pre-processing the $180^{th}$ occurrence of the branch 104 and/or the $180^{th}$ occurrence of the code CCC during the specific encounter of the loop 108), the $174^{th}$ iteration of the loop 108 is actually being executed by a processor (i.e., the CIC 312 is 174). Thus, in this example, the pipeline pre-processes 6 iterations in advance of the actual execution of the loop 108. Also, assume that the loop 108 terminates at the $174^{th}$ execution (e.g., due to a behavior change of the loop 108). In such a case, the CIC 312, the RC 320 and the SIC 512 are reset to zero, the final value of the CIC 312 (i.e., 174) before the reset is written to the PIC 316, and the information associated with the pre-processing of the last 6 iterations (i.e., iterations 175-180) are flushed from the pipeline.

In an example, it is also possible for the SIC 512 to be incremented in a shadow of a different mis-predicted branch (e.g., other than the branch 108). For example, instead of incrementing the SIC 512 based on prediction of the branch 108, the SIC 512 is incremented, by mistake, based on behavior of another branch. In order to maintain reliable prediction accuracy, it may be desired to restore the SIC 512 to its correct value, if it is found to have been incorrectly incremented. This can be accomplished by taking snapshots of the values of the complete prediction register structure 500 for the branch 104. If the branch 104 is found to have been mis-predicted, then the prediction register structure 500 is restored based on the snapshot values.

In an example, an "n" number of bits of each of the CIC 312, PIC 316 and SIC 512 can store histories of up to $2^n$ iterations. Thus, relatively small sizes of the register structures 300 and 500 can store histories of relatively large number of iterations of the loop 108.

A conventional branch predictor (which operates differently than the prediction done using the circuits 400 and 600) may operate and predict outcome of the branch 104. The conventional branch predictor may operate based on any appropriate known techniques. Although the prediction performed by the circuits 400 and 600 may often be better than a conventional branch predictor, in some scenarios (e.g., due to an unpredictability or erratic behavior of the loop 108) the circuits 400 and 600 may consistently mis-predict loop behavior of a specific loop. To address such a situation, in an example, a reliability counter (not illustrated in the figures) is added to the register structure 500. The reliability counter, for example, is a 2 bit counter and is initialized to a value of "11" in binary. When an end-of-loop branch is committed (i.e., whenever the execution exits the loop 108 and the current encounter with the loop 108 ends), the reliability counter is selectively updated. For example, if the prediction for the current encounter by the circuits 400 and 600 is correct, but the conventional branch predictor would have been incorrect, the reliability counter is incremented up to its maximum value (e.g., if the reliability counter has already reached or is initialized to its maximum value, no updating is performed; otherwise the reliability counter is incremented). On the other hand, if the prediction by the circuits 400 and 600 is incorrect, but the conventional branch predictor would have been correct, the reliability counter is decremented (e.g., if the reliability counter has already reached zero, no updating is performed; otherwise the reliability counter is decremented). If the prediction by the circuits 400 and 600 agrees with the conventional branch predictor, whether correct or incorrect, the reliability counter is unchanged.

In an example, if the reliability counter is higher than a threshold value (e.g., for a 2-bit reliability counter, if the reliability counter has a value of 11 or 10 in binary), it is assumed to provide high-quality predictions and those predictions take precedence over any other conventional branch predictors.

However, if the reliability counter is lower than a threshold value (e.g., for a 2-bit reliability counter, if the counter value drops to 01 or 00), the prediction by the circuit 400 and 600 for the loop 108 is assumed to be consistently incorrect. In such a scenario, the predictions by the circuits 400 and 600, though still performed, may no longer be given precedence over a conventional branch predictor. As the circuits 400 and 600 continue to make predictions even for hard-to-predict loops, the looping behavior may change, ultimately leading to the circuits 400 and 600 once again providing better predictions than a conventional predictor. This would let the reliability counter increment gradually, and ultimately allow the circuits 400 and 600 to once again provide predictions for the loop 108 once the reliability counter is sufficiently high.

In an example, if a conventional branch predictor is unavailable or for some other reason it is infeasible to compare against the predictions provided by the circuits 400 and 600, the register structure 500 comprises an incorrect counter (e.g., instead of, or in addition to, the reliability counter). The incorrect counter is initialized to zero. When the end of the loop 108 is incorrectly predicted, the incorrect counter is incremented; and when the end of the loop 108 is correctly predicted, the incorrect counter is decremented. If the incorrect counter becomes higher than a threshold value, the prediction by the circuits 400 and 600 is not used, although the circuits 400 and 600 may continue to make predictions. As the circuits 400 and 600 continues to make predictions even for hard-to-predict loops, the looping behavior may change, ultimately leading to the circuits 400 and 600 once again providing better predictions. In another example, if the incorrect counter becomes higher than the threshold value, the circuits 400 and 600 are not used for predicting the behavior of the loop 108.

Figure 7:
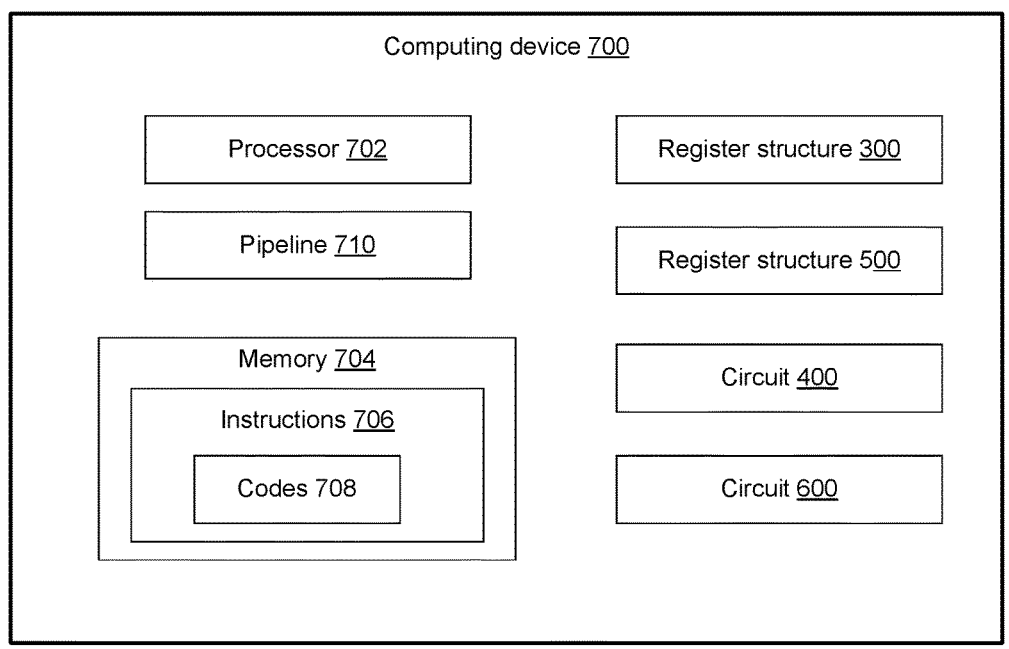
FIG. 7 illustrates an example computing device that includes various components for predicting behavior of a loop.

FIG. 7 illustrates an example computing device 700 that includes various components for predicting behavior of a loop that includes a backward pointing branch. The computing device 700 includes a processor 702 and memory 704. The memory 704 is an example of computer storage media (e.g., memory storage device) for storing instructions which are executed by the processors 702 to perform one or more functions described above. Memory 704 may generally include both volatile memory and non-volatile memory (e.g., RAM, ROM, or the like) devices, hard disk drives, solid-state drives, removable media, including external and removable drives, memory cards, flash memory, floppy disks, optical disks (e.g., CD, DVD), a storage array, a network attached storage, a storage area network, or the like. The memory 704 may be referred to as computer storage media herein, and may be a media capable of storing computer-readable, processor-executable program instructions as computer program code that can be executed by the processors 702 as a particular machine configured for carrying out the operations and functions described in the implementations herein. In an example, memory 704 stores instructions 706, including actual codes 708 associated with the pseudocodes 200. For example, the codes 708 comprise a loop (e.g., loop 108) including a branch (e.g., the branch 104), which, if taken, refers backwards to a lower addressed code (e.g., code CCC).

The processors 702 may comprise one or more hardware devices (e.g., integrated circuits) that may include a single processing unit or a number of processing units, all or some of which may include single or multiple computing units or multiple cores. The processors 702 can be implemented as one or more microprocessors, microcomputers, microcontrollers, digital signal processors, central processing units, state machines, logic circuitries, and/or any devices that manipulate signals based on operational instructions. Among other capabilities, the processors 702 can be configured to fetch and execute computer-readable instructions stored in the memory 704 or other computer-readable media.

The computing device 700 further includes a pipeline 710. In an example, the pipeline 710 is included within, or is a part of the processor 702. In an example, prior to the processor 702 executing a section of the code 708, the pipeline 710 pre-fetches the section of the code 708 from the memory 704, and pre-processes the section of the code 708. Such pre-fetching and/or pre-processing is based on, for example, a prediction as to which section of the code 708 the processor 702 is likely going to execute next. In an example, the computing device 700 further comprises the register structures 300 and 500, and the circuits 400 and 600 used for such predictions, as illustrated in FIG. 7.

Although not illustrated in FIG. 7, the computing device 700, in an example, comprises a loop buffer. A loop buffer is here defined to be a structure which captures a loop (e.g., the loop 108) with limited number of microops. Though the loop can feature one or more forward branches, it can only have one backwards branch (e.g., the branch that refers to the code CCC). The loop buffer, in order to be engaged, may also require that all captured branches be "strongly" predicted in whatever direction they predict (e.g., the backwards branch is to be strongly predicted "taken") and that one or more history registers associated with any conventional branch predictors be saturated. The "strongly" predicted may be, for example, because the loop buffer temporarily disables the conventional branch predictors and so, provides the same prediction for each captured branch each time. The saturation of the one or more history registers may, for example, ensure that conventional branch predictors would be unable to predict a final iteration of the loop. The loop buffer provides the benefit of effectively caching the microcoding of any macroops, removing any pipeline bubble penalties of taking branches, and saves power by powering down much of the front end of the pipeline. The loop buffer can traditionally only be disengaged by mis-predicting one of the branches. This involves a pipeline flush and lost performance. In an example, the circuits 400 and 600 can provide a more graceful exit from the loop buffer. For example, instead of relying on a mis-predicted branch and pipeline flush, the circuits 400 and 600, by staying active while the loop buffer is engaged, can provide a prediction for the end of the loop and force an exit from the loop buffer.

Figure 8:
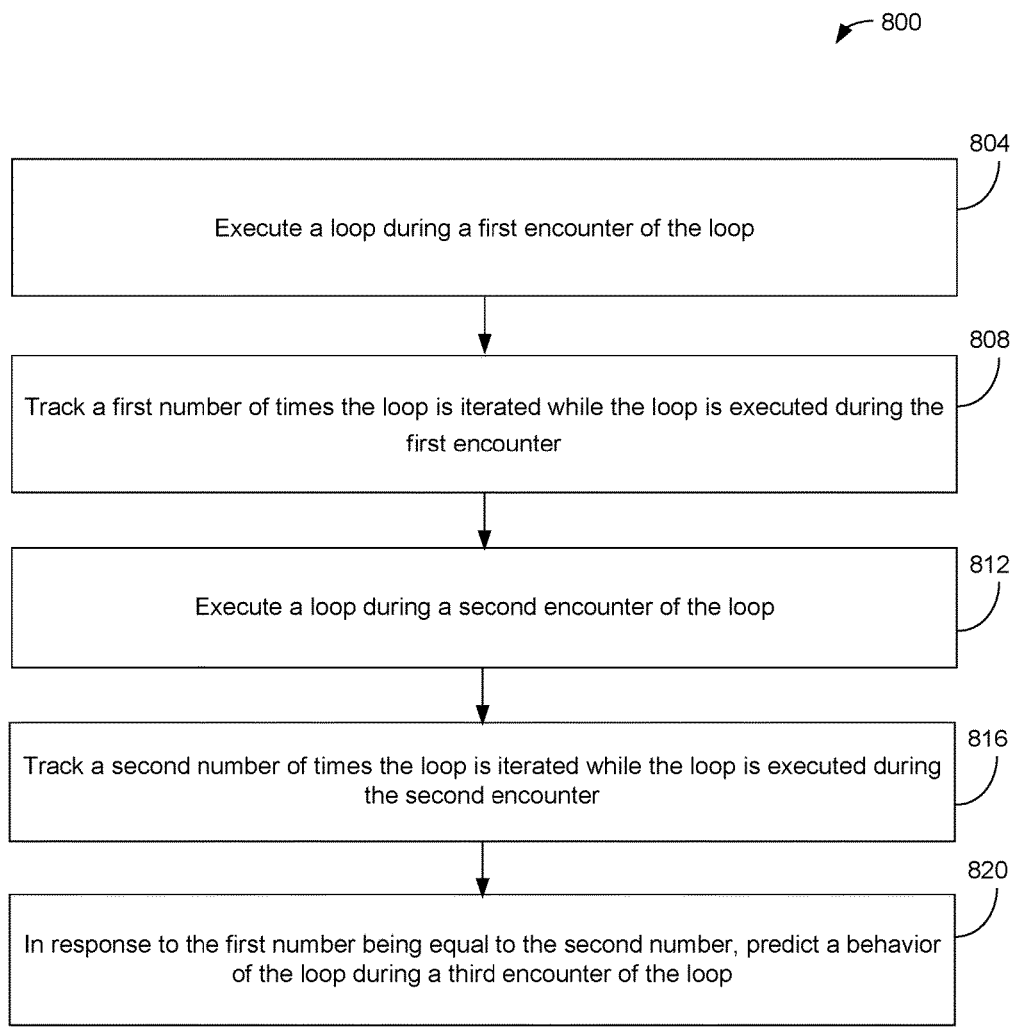
FIG. 8 illustrates a flow diagram of an example method for tracking past behavior of a loop, and predicting future behavior of the loop.

FIG. 8 illustrates a flow diagram 800 of an example method 800 for tracking past behavior of a loop and a branch (e.g., the loop 108 and the branch 104), and predicting future behavior of the loop. At 804, the loop is executed during a first encounter of the loop. At 808, a first number of times that the loop is iterated, while the loop is executed during the first encounter, is tracked. For example, the first number may be stored in the PIC 316 at the end of the first encounter.

At 812, the loop is executed during a second encounter of the loop. At 816, a second number of times that the loop is iterated, while the loop is executed during the second encounter, is tracked. For example, a final value of the CIC 312, at the end of the second encounter, stores the second number.

At 820, in response to the first number being equal to the second number (e.g., the final value of the CIC 312 at the end of the second encounter being equal to the value of the PIC 316), a future behavior of the loop during a third encounter of the loop is predicted (e.g., by the circuit 600 of FIG. 6). In an example, in response to the prediction of the behavior of the loop during the third encounter of the loop, at least a section of the loop is selectively pre-fetched and pre-processed, e.g., by the instruction pipeline 710.

The description may use the phrases "in an embodiment," or "in embodiments," which may each refer to one or more of the same or different embodiments. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method performed by a computing device to predict loop behavior, the method comprising:
   executing a loop during a first encounter of the loop;
   tracking a first number of times the loop is iterated while the loop is executed during the first encounter;
   executing the loop during a second encounter of the loop;
   tracking a second number of times the loop is iterated while the loop is executed during the second encounter;
   comparing the first number of times the loop is iterated to the second number of times the loop is iterated;
   generating, based on the comparison of the first number to the second number, an output having one of two values, the two values of the output including (i) a first value generated in response to the first number being equal to the second number and (ii) a second value generated in response to the first number not being equal to the second number and being effective to prevent prediction of loop behavior during a subsequent encounter with the loop; and
   in response to the value of the output being the first value indicating that the first number is equal to the second number, predicting a behavior of the loop during a third encounter of the loop; or
   in response to the value of the output being the second value indicating that the first number is not equal to the second number, not predicting the behavior of the loop during the third encounter of the loop.

2. The method of claim 1, wherein the behavior of the loop predicted during the third encounter of the loop comprise
   a number of predicted iterations of the loop during the third encounter of the loop that is equal to the first and second numbers.

3. The method of claim 1, further comprising:
   in response to the first number being equal to the second number, updating a counter.

4. The method of claim 3, wherein the counter comprises a repeated counter; and
   wherein updating the counter comprises
   updating the repeated counter to have a value of at least two.

5. The method of claim 1, wherein the first and second encounters of the loop are part of a larger group of consecutive encounters of the loop that have a same number of iterations as the first and second encounters of the loop; and
   wherein the prediction is further based on a number of the consecutive encounters of the loop that had the same number of iterations as the first and second encounters passing a threshold number.

6. The method of claim 5,
   wherein the threshold number is inversely proportional to the first number.

7. The method of claim 1, wherein the prediction is performed by a first predictor circuit, and wherein the method further comprises:
   predicting the behavior of the loop using a second predictor circuit;
   comparing a prediction provided by the first predictor circuit with a prediction provided by the second predictor circuit;
   based on the comparing, updating a reliability counter, wherein the reliability counter provides a reliability of prediction provided by the first predictor circuit; and
   wherein the prediction is further based on the reliability counter.

8. The method of claim 1, further comprising:
   in response to the first number being equal to the second number, speculatively pre-fetching and pre-processing at least a section of the loop.

9. The method of claim 8, wherein the tracking of the first and second encounters of the loop and the prediction are performed by a circuit of the computing device; and
   wherein the method further comprises, sending the prediction to a pipeline of the computing device that causes a processor of the computing device to perform the pre-fetching and pre-processing.

10. The method of claim 1, wherein the first and second numbers are stored within a register structure of the computing device.

11. A device comprising:
   memory storing instructions that includes a loop;
   a processor configured to execute the loop during (i) a first encounter of the loop and (ii) a second encounter of the loop; and
   a circuit configured to
   track (i) a first number of times the loop is iterated while the loop is executed during the first encounter and (ii) a second number of times the loop is iterated while the loop is executed during the second encounter compare the first number of times the loop is iterated to the second number of times the loop is iterated;

generate, based on the comparison of the first number to the second number, an output having one of two values, the two values of the output including (i) a first value generated in response to the first number being equal to the second number and (ii) a second value generated in response to the first number not being equal to the second number and being effective to prevent prediction of loop behavior during a subsequent encounter with the loop; and in response to the value of the output being the first value indicating that the first number is equal to the second number, predict a behavior of the loop during a third encounter of the loop; or in response to the value of the output being the second value indicating that the first number is not equal to the second number, not predict the behavior of the loop during the third encounter of the loop.

12. The device of claim 11, wherein the behavior of the loop predicted during the third encounter of the loop comprises a number of predicted iterations of the loop during the third encounter of the loop that is equal to the first and second numbers.

13. The device of claim 11, wherein the circuit is further configured to:

in response to the first number being equal to the second number, updating a counter.

14. The device of claim 13, wherein the counter comprises a repeated counter; and wherein updating the counter comprises updating the repeated counter have a value of at least two.

15. The device of claim 11, wherein the first and second encounters of the loop are part of a larger group of consecutive encounters of the loop that have a same number of iterations as the first and second encounters of the loop; and wherein the prediction is further based on a number of the consecutive encounters of the loop that had the same number of iterations as the first and second encounters passing a threshold number.

16. The device of claim 15, wherein the threshold number is inversely proportional to the first number.

17. The device of claim 11, wherein the circuit is a first predictor circuit, and wherein the device further comprises:

a second predictor circuit configured to predict the behavior of the loop, wherein the device is configured to:

compare a prediction provided by the first predictor circuit with a prediction provided by the second predictor circuit, based on the comparing, updating a reliability counter, wherein the reliability counter provides a reliability of prediction provided by the first predictor circuit, and wherein the prediction is further based on the reliability counter.

18. The device of claim 11, further comprising:

an instruction pipeline, wherein in response to the behavior of the loop being predicted the instruction pipeline is configured to, responsive to the behavior of the loop during the third encounter of the loop being predicted, cause the processor to speculatively pre-fetch and pre-process at least a section of the loop prior to the processor executing the third encounter of the loop completely.

19. The device of claim 11, further comprising a register structure; and wherein the circuit is further configured to store the first and second numbers within the register structure.

20. The device of claim 19, wherein the prediction is provided at least partially as an output of a multiplexer operably coupled to the register structure.

* * * * *